United States Patent
Messner et al.

(10) Patent No.: US 10,819,170 B2
(45) Date of Patent: Oct. 27, 2020

(54) STATOR SUPPORT FOR A STATOR OF A WIND TURBINE GENERATOR, STATOR, GENERATOR, AND WIND TURBINE COMPRISING THE STATOR SUPPORT

(71) Applicant: Wobben Properties GmbH, Aurich (DE)

(72) Inventors: Birte Messner, Bensersiel (DE); Jochen Röer, Ganderkesee (DE); Jan Carsten Ziems, Aurich (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 16/471,346

(22) PCT Filed: Dec. 21, 2017

(86) PCT No.: PCT/EP2017/084228
§ 371 (c)(1),
(2) Date: Jun. 19, 2019

(87) PCT Pub. No.: WO2018/115357
PCT Pub. Date: Jun. 28, 2018

(65) Prior Publication Data
US 2019/0334394 A1   Oct. 31, 2019

(30) Foreign Application Priority Data
Dec. 21, 2016   (DE) .................. 10 2016 125 218

(51) Int. Cl.
*H02K 1/20*   (2006.01)
*F03D 9/25*   (2016.01)
(Continued)

(52) U.S. Cl.
CPC ............. *H02K 1/20* (2013.01); *F03D 9/25* (2016.05); *F03D 80/60* (2016.05); *H02K 1/187* (2013.01);
(Continued)

(58) Field of Classification Search
CPC ... H02K 1/20; F03D 9/25; F03D 80/60; F05B 2260/20
See application file for complete search history.

(56) References Cited

U.S. PATENT DOCUMENTS

| | | | | |
|---|---|---|---|---|
| 5,491,371 A | * | 2/1996 | Ooi | ............ H02K 1/20 310/216.016 |
| 5,859,483 A | * | 1/1999 | Kliman | ............ H02K 1/20 310/216.004 |

(Continued)

FOREIGN PATENT DOCUMENTS

| | | |
|---|---|---|
| DE | 10225221 A1 | 1/2004 |
| DE | 102004018758 A1 | 3/2005 |

(Continued)

*Primary Examiner* — Sean Gugger
(74) *Attorney, Agent, or Firm* — Seed Intellectual Property Law Group LLP

(57) ABSTRACT

A stator carrier for a stator of a wind turbine generator, in particular a multi-pole slowly rotating synchronous ring generator. It is proposed that the stator comprises a first carrier plate, a second carrier plate, a cavity which is provided between the two carrier plates and is open radially outwardly, a separating plate which is arranged between the two carrier plates and which subdivides the cavity into a first cavity portion and a second cavity portion, wherein there is provided a number of first flow passages extending from the first carrier plate directly into the second cavity portion and a number of second flow passages extending from the second carrier plate directly into the first cavity portion.

(Continued)

There is further proposed a stator having such a stator carrier as well as a generator and a wind turbine having same.

19 Claims, 6 Drawing Sheets

(51) Int. Cl.
    *F03D 80/60*         (2016.01)
    *H02K 1/18*          (2006.01)
    *H02K 7/18*          (2006.01)

(52) U.S. Cl.
    CPC ........ *H02K 7/1838* (2013.01); *F05B 2260/20* (2013.01)

(56) References Cited

U.S. PATENT DOCUMENTS

| | | | |
|---|---|---|---|
| 6,762,525 B1 * | 7/2004 | Maslov | H02K 1/182 310/112 |
| 8,319,362 B2 * | 11/2012 | Vihriala | F03D 80/60 290/44 |
| 9,624,908 B2 | 4/2017 | Airoldi et al. | |
| 9,631,607 B2 | 4/2017 | Gudewer | |
| 10,359,028 B2 * | 7/2019 | Ma | H02K 9/04 |
| 2007/0103027 A1 * | 5/2007 | Jansen | H02K 5/20 310/266 |
| 2010/0225183 A1 * | 9/2010 | Baik | H02K 55/04 310/58 |
| 2011/0260467 A1 * | 10/2011 | Gudewer | F03D 17/00 290/1 B |
| 2016/0084226 A1 | 3/2016 | Eriksen et al. | |
| 2017/0149307 A1 * | 5/2017 | Ichinoe | H02K 9/005 |

FOREIGN PATENT DOCUMENTS

| | | |
|---|---|---|
| EA | 015583 B1 | 10/2011 |
| EP | 2806542 A1 | 11/2014 |
| RU | 2047257 C1 | 10/1995 |
| RU | 2506682 C2 | 2/2014 |

* cited by examiner

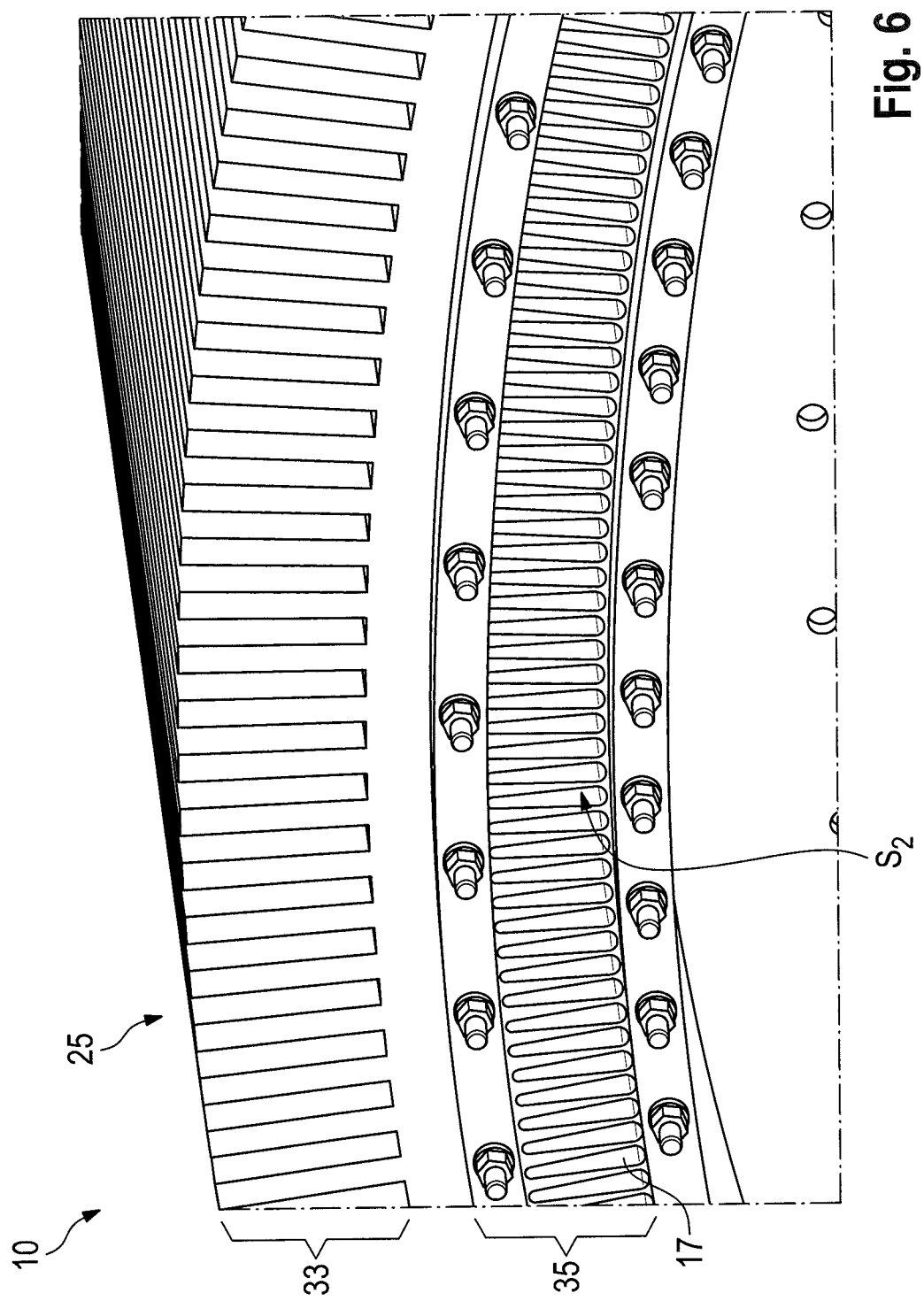

STATOR SUPPORT FOR A STATOR OF A WIND TURBINE GENERATOR, STATOR, GENERATOR, AND WIND TURBINE COMPRISING THE STATOR SUPPORT

BACKGROUND

Technical Field

The present invention concerns a stator carrier for a stator of a wind turbine generator, in particular a multi-pole slowly rotating synchronous ring generator.

Description of the Related Art

Stator carriers and stators as indicated above are generally known.

In operation of the wind turbine generator, heat is generated in the generator, in particular in the region of the stator winding, as a result of the voltage induced by the excitation field. It is therefore necessary to dissipate heat from the stator to ensure the power yield and reliability of the wind turbine generator. Various approaches have already been adopted in this regard in the state of the art. Previously proposed cooling methods are confronted with the requirement that the stator of a wind turbine is of a comparatively great depth, more specifically typically 0.5 meters or more, sometimes even 1.0 meters or more.

Cooling concepts are known in the state of the art, in which the air is guided in forced convection in an axial direction from one end of the stator to the other end of the stator through cooling passages. Here, due to the depth of the stator, the problem arises that the air is already quickly heated after passing into the stator, and then at the latest from the center of the stator (in the axial direction) it is already heated to such an extent that no further effective heat dissipation is implemented, which leads to uneven temperature development within the stator. This can result in a deterioration in performance and in the worst-case scenario functional impairment.

Other endeavours have attempted to guide cool air radially from the inside through the stator carrier into the vicinity of the stator winding of the stator, approximately in the region of the center of the stator (in the axial direction). The air then had to issue from the stator axially towards both ends. That has the disadvantage that removal of the heated air, in particular on the side of the stator facing the rotor hub, from which the air flows to the wind turbine, is difficult. Circulatory flows are formed, which have the result that air which has already been preheated flows into the interior of the stator again and flows again through the cooling openings, which also impairs the cooling performance. Furthermore there are numerous endeavours in the state of the art to cool the stator of the wind turbine generator with a liquid-based cooling circuit. While that cooling principle allows a strong heat dissipation, the structural effort for achieving that is comparatively high, and special precautions are required because the liquid circuit passes in the immediate proximity of the current-carrying stator windings.

BRIEF SUMMARY

Provided is an improved cooling concept for wind turbine generators of the kind set forth in the opening part of this specification.

Provided is a stator carrier of the kind set forth in the opening part of this specification. The stator carrier has a first carrier plate, a second carrier plate and a cavity formed between the two carrier plates, which is open radially outwardly, and a separating plate arranged between the two carrier plates, which subdivides the cavity into a first cavity portion and a second cavity portion, in particular in such a way that no air can flow directly from the first cavity portion into the second cavity portion. In addition the stator carrier has a number of first flow passages extending from the first carrier plate directly into the second cavity portion, and a number of second flow passages extending from the second carrier plate directly into the first cavity portion.

The invention is based on the approach that a forced radial flow of air from the cavity portion to the exterior comes about by means of a separating plate. Furthermore air can flow into the cavity portions only through the respective flow passages connected to them. In other words air flowing to the first carrier plate from outside the stator carrier flows through the flow passages, bypassing the first cavity portion, directly into the second cavity portion from where it flows radially outwardly from the stator carrier. In addition air flowing radially from outside the stator carrier toward the stator carrier, for example from the side of the first carrier plate, flows radially inwardly into the first cavity portion, and is then directly discharged through the second flow passages towards the side of the second carrier plate without being able to flow through the second cavity portion.

That two-part configuration of the stator carrier has the following effect: if the stator carrier is mounted in a stator in such a way that its radially outwardly open cross-portion is connected in flow conducting relationship to opening grooves which extend in the axial direction through the stator carrier, essentially two predefined flow paths are defined through the stator. A first flow path is for air which flows to the stator from a first side and enters the ventilation grooves of the stator. The air is guided through the ventilation grooves to that region in which the stator carrier is arranged, there passes into the first cavity portion of the stator carrier, and is expelled past the second cavity portion from the second flow passages. A second flow path is for air flowing to the stator from the first side, therein the air passes through the first flow passages into the stator carrier, passes directly into the second cavity portion, and from there is passed radially outwardly into the ventilation grooves of the stator from where it then issues on the second stator side again. Thus, with the stator carrier according to the invention, fresh cooling air is being constantly introduced both at the first end of the stator on the afflux flow side and also in the inner region of the stator at the location where the stator carrier is mounted. As a result a significantly improved cooling performance is achieved.

An advantageous development of the stator provides that the flow passages are respectively arranged distributed uniformly around the periphery of the carrier plates. That permits a more uniform distribution of the air over the stator in the installed state of the stator carrier.

In a preferred embodiment the first flow passages are arranged in displaced relationship relative to the second flow passages in the peripheral direction of the carrier plates. Alternatively or additionally preferably the first and second flow passages are arranged on the same pitch circle diameter.

In a preferred embodiment the first and second flow passages each have the same opening cross-section. This ensures that the flow resistance that a first of the partial flows experiences when flowing into the stator is equal to the flow resistance that the second partial flow experiences when flowing out of the stator. This supports flow formation of equal strength in the first and second cavity portions and supports uniform cooling of the stator with installed stator carrier.

Preferably the first and second flow passages are oriented parallel to the longitudinal axis of the stator carrier. This achieves a favourable entry flow behaviour.

Preferably, the separating plate is supported by means of a number of support struts in relation to the first and second carrier plates. As a result the mechanical stability of the stator carrier is improved, and the separating plate is reliably held in position between the two carrier plates. The support struts are preferably adapted to produce turbulence within the first and second cavity portions, so that a greater distribution of the air in the peripheral direction takes place within the stator carrier. This also has an advantageous effect on the cooling performance.

Hereinbefore the invention has been described according to a first aspect with reference to the stator carrier itself. In a second aspect the invention additionally concerns a stator for a generator of a wind turbine, in particular for a multi-pole slowly rotating synchronous ring generator.

The stator has a laminated stator core and a stator carrier to which the laminated stator core is fixed, wherein the laminated stator core has a first radial region for receiving a stator winding and a second radial region adjacent thereto and having a plurality of ventilation grooves which are open to a first end of the stator and an opposite second end of the stator, wherein the stator carrier is according to one of the above-described preferred embodiments according to the first aspect, and the ventilation grooves in the region of the stator carrier are connected in fluid-conducting relationship to the cavity of the stator carrier.

With regard to the advantages and some preferred embodiments of the stator, reference is directed to the foregoing description relating to the first aspect of the invention. Cooling air can enter the stator either through the ventilation grooves or the first flow passages. That air which passes into the stator through the ventilation grooves is introduced into the first cavity portion in the region of the stator carrier and issues from the stator through the second flow passages. That air which passes into the stator by means of the first flow passages is guided in the region of the stator carrier into the second cavity portion and from there into the ventilation grooves so that it issues from the ventilation grooves from the stator carrier.

The ventilation grooves are preferably interrupted by a separating wall which, viewed in the axial direction, is arranged between the first and second carrier plates of the stator carrier. Particularly preferably the separating wall of the ventilation grooves and the separating plate of the stator carrier are arranged in the same plane. This is preferably achieved in that the separating wall of the ventilation grooves is in the form of part of the separating plate of the stator carrier. The introduction of a separating wall into the ventilation grooves in the plane of the separating plate of the stator carrier ensures a defined flow path because circulatory flows are prevented.

Preferably the generator is in the form of a ring generator. Accordingly the magnetically active regions of the rotor and stator, namely, in particular the laminated stator cores, are arranged in an annular region around an air gap which separates the generator rotor and the stator. In that case the generator is free of magnetically active regions in an inner region of a radius of at least 50% of the mean air gap radius.

A ring generator can also be defined by the radial size of the magnetically active parts, or—in other words—the magnetically active region, more specifically the radial thickness from the inner edge of the pole wheel to the outer edge of the stator, or from the inner edge of the stator to the outer edge of the generator rotor, in the case of an external rotor, is smaller than the air gap radius, in particular the radial size of the magnetically active region of the generator is less than 30%, in particular less than 25% of the air gap radius. In additional or alternatively a ring generator can be defined by the fact that the depth, namely the axial extent of the generator, is smaller than the air gap radius, in particular, the depth is less than 30%, in particular less than 25% of the air gap radius.

Additionally or alternatively a ring generator is preferably of a multi-pole design, and has at least 48, 96 or at least 192 rotor poles.

According to the invention the term slowly rotating generator is used to mean a generator having a rotational speed of 50 revolutions per minute or less, preferably 30 revolutions per minute or less.

The invention has been described hereinbefore with reference to the stator carrier and the stator according to the first and second aspects of the invention. In a third aspect the invention further relates to a generator of a wind turbine, in particular a multi-pole slowly rotating synchronous ring generator.

The invention attains the object set forth in the opening part of this specification in a generator of the above-mentioned kind in that the generator has a generator rotor, in particular in the form of an external rotor, a stator around which the generator rotor is arranged to rotate, and a stator carrier to which the stator is secured, wherein the stator carrier is formed according to one of the above-described preferred embodiments, and/or wherein the stator is according to one of the above-described preferred embodiments.

In regard to the advantages of the preferred embodiments of the generator according to the invention reference is directed to the embodiments described above for the first and second aspects.

A preferred development of the generator according to the invention provides a number of fans for generating an air flow through the interior of the generator. The number of fans is preferably adapted to suck in air from the interior of the generator and blow it out of the generator. By the number of fans being in the form of suction fans relative to the interior of the generator the unwanted formation of a heat accumulation in the generator interior is avoided, or at least the probability thereof is restricted.

In a preferred embodiment the generator has a first side facing the rotor hub and an opposite side facing away from the rotor hub, wherein the number of fans is arranged on the second side of the generator, and is particularly preferably arranged stationarily.

In preferred embodiments the stator carrier is preferably mounted on a journal or machine support in the pod of the wind turbine, and the number of fans is also mounted on the journal and/or the machine support.

Preferably there is provided a plurality of fans which are arranged uniformly around the periphery of the generator to suck in air from the generator interior. The consequence of that suction intake is that, from the first side of the generator, that is to say from the rotor hub side, air flows to the generator, enters the stator through the flow passages and ventilation grooves defined according to the invention and issues again through the respectively corresponding flow passages and ventilation grooves.

In a further aspect the invention concerns a wind turbine. The invention attains the object set forth in the opening part of the specification in a wind turbine by having a generator according to one of the preferred embodiments described above.

BRIEF DESCRIPTION OF THE SEVERAL VIEWS OF THE DRAWINGS

The invention is described in greater detail hereinafter with reference to the accompanying Figures by means of a preferred embodiment. In the Figures:

FIG. 6 shows a detailed representation of the stator from FIG. 5.

DETAILED DESCRIPTION

Figure 1:
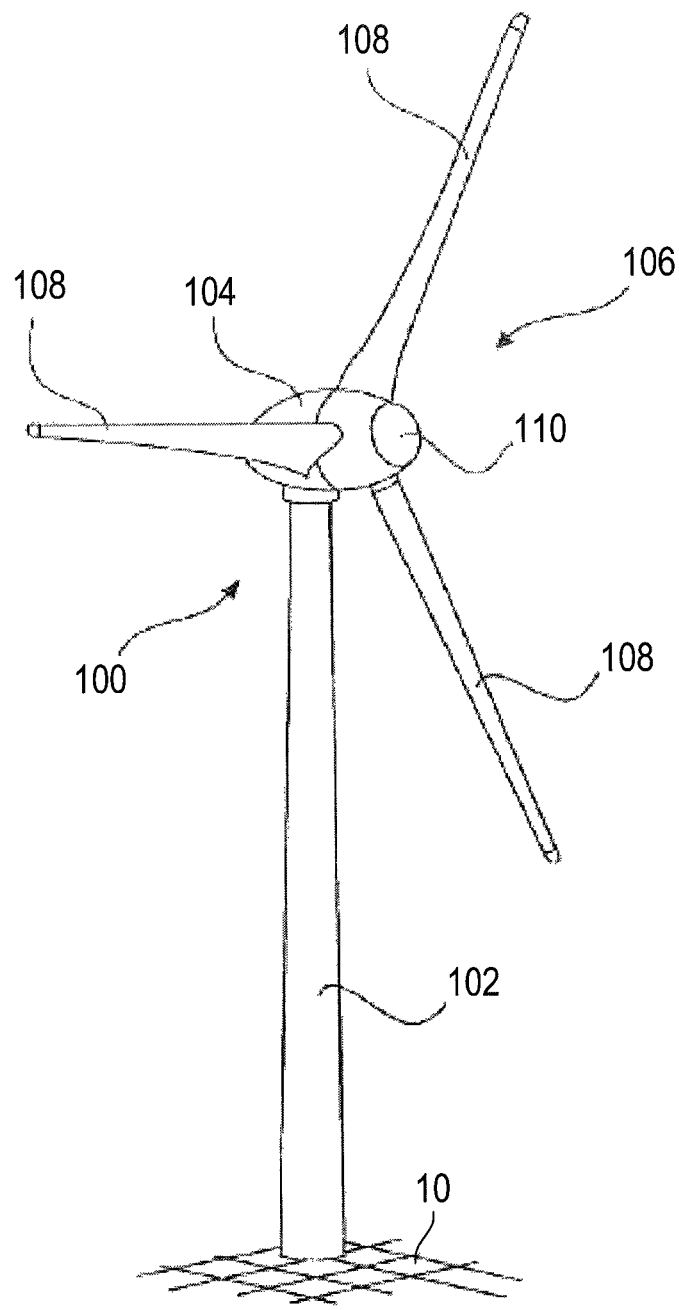
FIG. 1 shows a wind turbine according to the present invention.

FIG. 1 shows a wind turbine 100 with a tower 102 and a pod 104. A rotor 106 with three rotor blades 108 and a spinner 110 is arranged at the pod 104. In operation the rotor 106 is set in rotation by the wind and thereby drives a generator in the pod 104.

Figure 2:
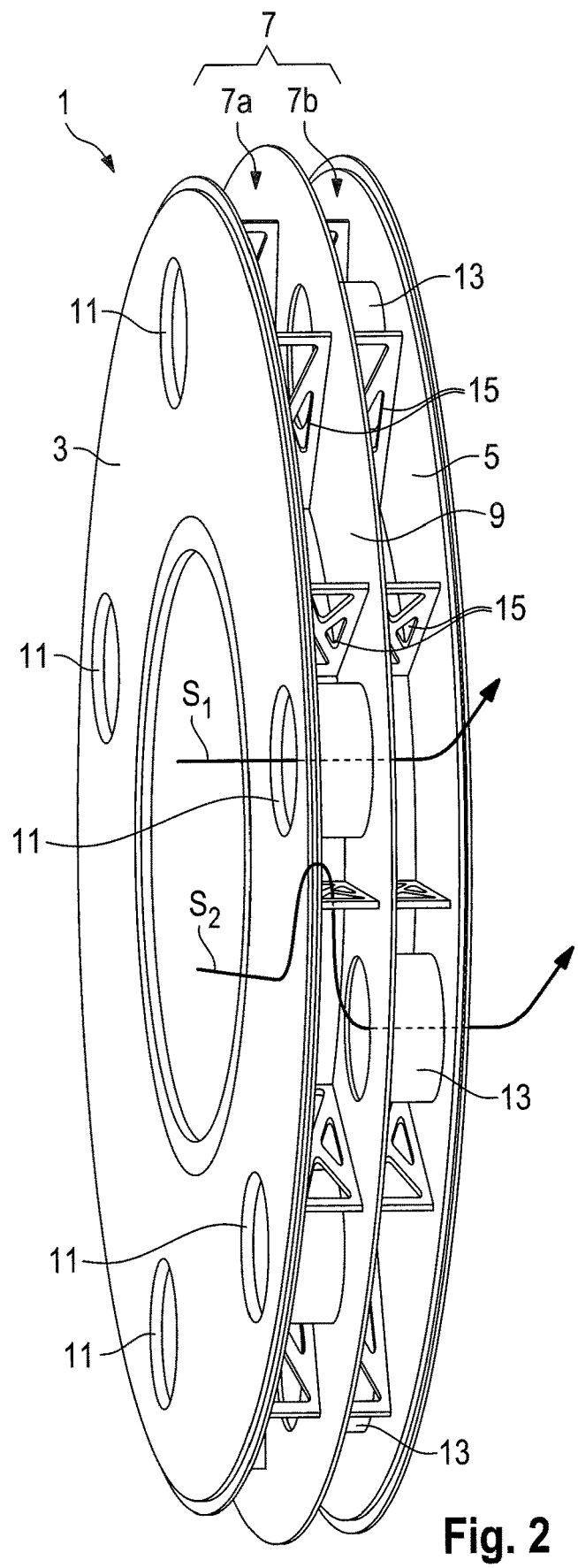
FIG. 2 shows a stator carrier according to a preferred embodiment by way of example for a wind turbine as shown in FIG. 1.

FIG. 2 shows a stator carrier 1 provided inside the pod 104 of the wind turbine 100 shown in FIG. 1. The stator carrier 1 has a first carrier plate 3 and a second carrier plate 5. The two carrier plates 3, 5 are spaced from each other and have a cavity 7 between them. A separating plate 9 is arranged in the cavity 7, which divides the cavity 7 into a first cavity portion 7a and a second cavity portion 7b.

Provided in the first carrier plate 3 is a number of first flow passages 11 which extend from the first carrier plate 3 directly into the second cavity portion 7b. An afflux flow of air passes through the first flow passages 11 directly into the second cavity portion 7b, but not into the first cavity portion 7a.

The second carrier plate 5 has a number of second flow passages 13 which preferably correspond to the number of the first flow passages 11, are arranged in displaced relationship with the first flow passages 11 on the same pitch circle diameter and distributed over the periphery. The second flow passages 13 extend from the second carrier plate 5 directly into the first cavity portion 7a so that air flowing radially from the outside into the first cavity portion 7a passes directly through the second flow passages 13 to the second carrier plate 5, but not into the second cavity portion 7b.

Preferably the separating plate 9 is arranged equidistantly between the first and second carrier plates 3, 5. The separating plate 9 is preferably supported by means of a number of support struts 15 against the first and second carrier plates 3, 5 and particularly preferably contributes to stiffening the mechanical structure of the stator carrier 1. The support struts 15 are preferably adapted to provide, for example by means of recesses provided therein, for flow turbulence in the respective cavity portions 7a, 7b to promote the distribution along the periphery of air flowing in or through same.

FIG. 2 shows a first flow path $S_1$ and a second flow path $S_2$ which diagrammatically show the two possible transport paths for air through the stator carrier. According to the flow path $S_1$ air can flow from the first side 25 (FIG. 4) to the first carrier plate 3, from where it passes directly through the first flow passages 11 into the second cavity portion 7b, in order from there to issue radially outwardly from the stator carrier 1. However air can only pass into the first cavity portion 7a by flowing radially into the stator carrier 1 from the outside along the flow path $S_2$. From the first cavity portion 7a the air can then issue through the second flow passages 13 towards the second carrier plate 5 and out of the stator carrier 1 towards the second side. While with the first flow path $S_1$ therefore fresh incoming air is transported directly into the second cavity portion and thus the right half of the stator carrier equally air which has already flowed through the stator is passed at the location of the stator carrier radially into the first cavity portion 7a from where it can then issue from the stator carrier, bypassing the second cavity portion 7b, directly through the second flow passages 13. Cool air therefore only has to flow through a portion of the stator in the axial direction, regulated by the geometry of the stator carrier. Further details also relating to the installation situation of the stator carrier can be seen from the following Figures.

Figure 3:
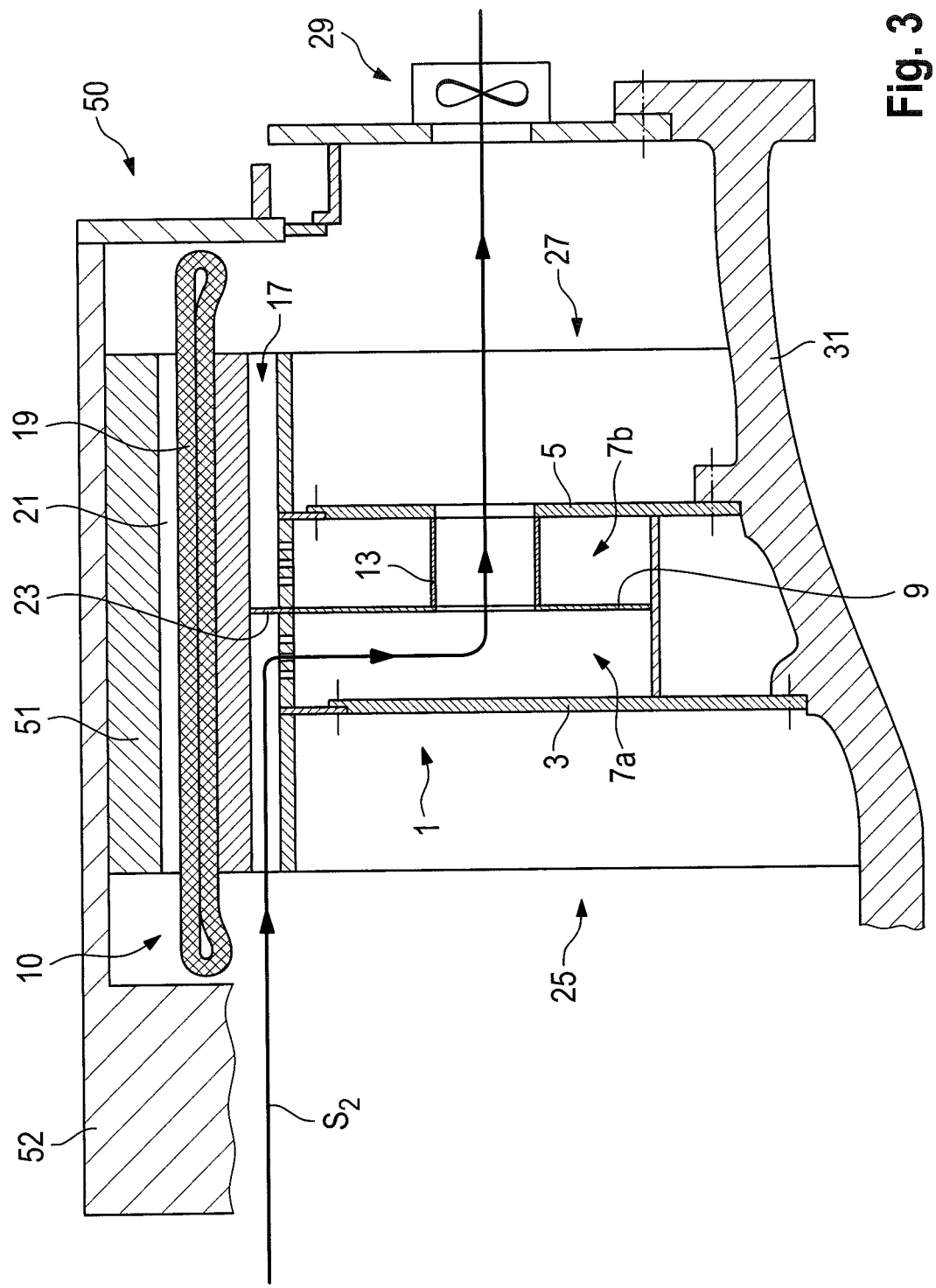
FIG. 3 shows a first diagrammatic sectional view through the stator carrier as shown in FIG. 1.

FIG. 3 shows the diagrammatic arrangement of the stator carrier 1 on a stator 10. The stator 10 is part of a generator 50 which is arranged in the interior of the wind turbine as shown in FIG. 1. FIG. 3 shows the section through the stator carrier 1 in the plane in which the second flow path $S_2$ lies.

In addition to the stator carrier 1 the stator 10 has a plurality of ventilation grooves 17 which are arranged in the region 33 (FIG. 6) of the magnetic return of the stator and extend substantially axially through the stator 10. Adjacent to the ventilation grooves 17 the stator 10 has a stator winding 19.

The stator 10 is surrounded by an air gap 21. Arranged around the stator 10 is a generator rotor 52 with its rotor winding 51. The generator rotor 52 is connected to the rotor hub in a generally known manner.

The grooves 17 within the stator 10 are interrupted by a separating wall 23. Between the ventilation grooves 17 and the cavity portions 7a, 7b there is a fluid-conducting connection in the region of the stator carrier 1. In that way the air flow $S_2$ which flows to the stator 10 at a first side 25 from the rotor hub can pass through the ventilation grooves 17 into the stator 10 and absorb thermal energy from the stator winding 19. Upon reaching the separating wall 23 the air flow $S_2$ is directed radially inwardly into the first cavity portion 7a, from where it can issue from the stator carrier 1 and the stator 10, without the air of the air flow $S_2$ which has already been heated in the first half of the stator 10 additionally also being capable of flowing past the portions of the stator winding 19 on the other side of the separating wall 23. Preferably, the separating wall 23 is arranged on the same plane as the separating plate 9 of the stator carrier 1. Particularly preferably the separating wall 23 is an extension of the separating plate 9.

Figure 4:
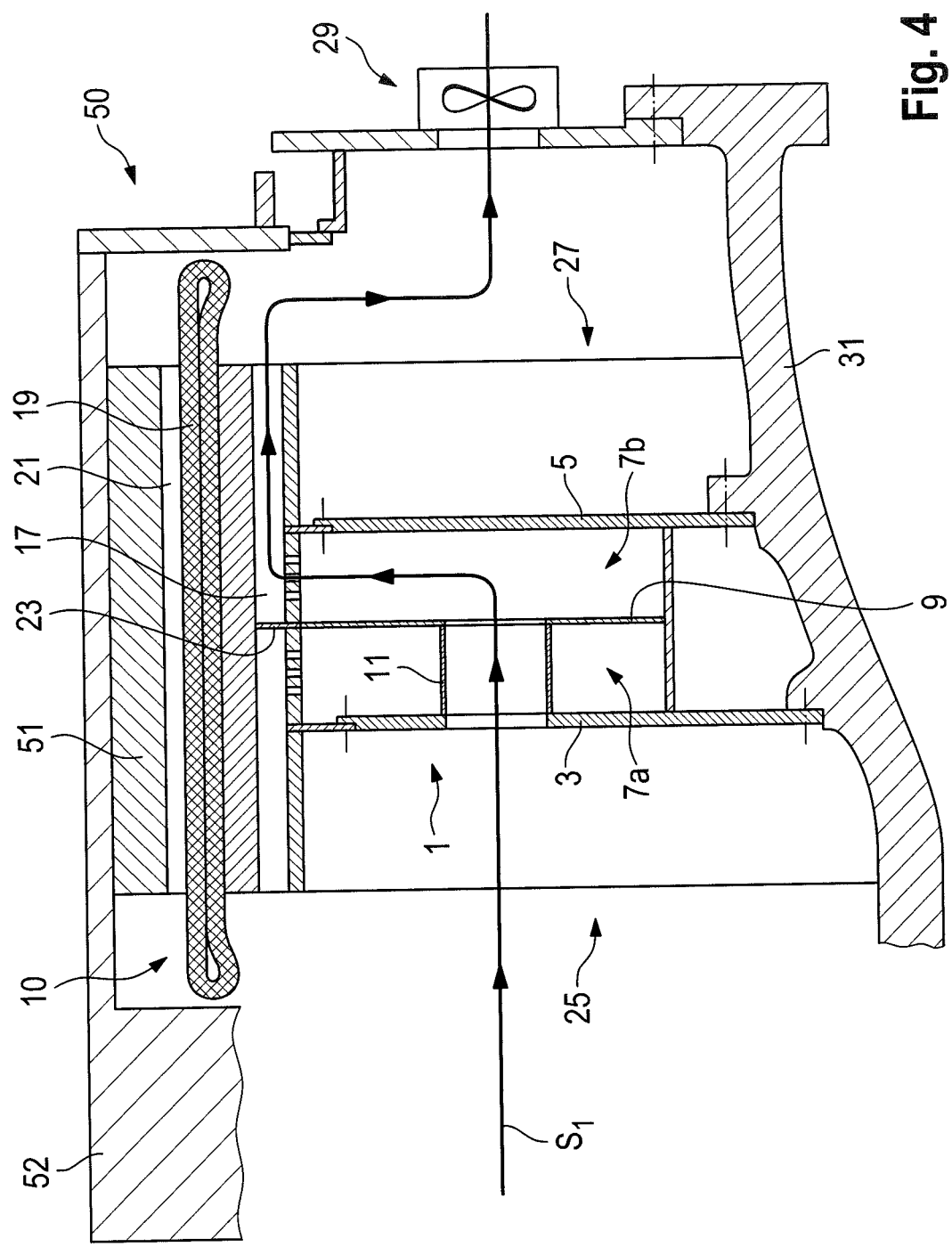
FIG. 4 shows a second diagrammatic sectional view through the stator carrier as shown in FIG. 2.

As can be seen from FIG. 4 which is in the sectional plane of the first flow path $S_1$ a similar air guide process takes place for the right half of the stator 10 in FIGS. 3 and 4. Air can pass into the stator 10 along the flow path $S_1$ but is introduced directly into the second cavity portion 7b through the first flow passages 11 within the stator carrier 1, without first being able to flow into the first cavity portion 7a. From there the air is forced to flow radially outwardly into the ventilation grooves 17, and from there to the second side 27 of the stator 10, where it issues from the stator 10. Due to the separating wall 23 it is not possible for the air to flow back out of the cavity portion 7b against the desired flow direction, that is to say towards the rotor hub, which reliably avoids a circulatory flow with heated air.

As can be seen from FIGS. 3 and 4 preferably at least one fan 29 is associated with the generator 50. The fan 29 is preferably adapted to suck in air out of the interior of the generator 50 so that a reduced pressure is produced, which sucks air along the flow paths $S_1$ and $S_2$ into the stator 10 from the rotor hub, that is to say the first side 25 of the stator 10. Fresh cooling air is supplied to the stator winding on the one hand at the side 25 on entering the ventilation grooves, and on the other hand immediately behind the separating wall 23 so that both regions of the stator winding 19 in front of and behind the separating wall 23 can be equally supplied with fresh cooling air. The at least one fan 29 is preferably fixed to a journal 31.

Figure 5:
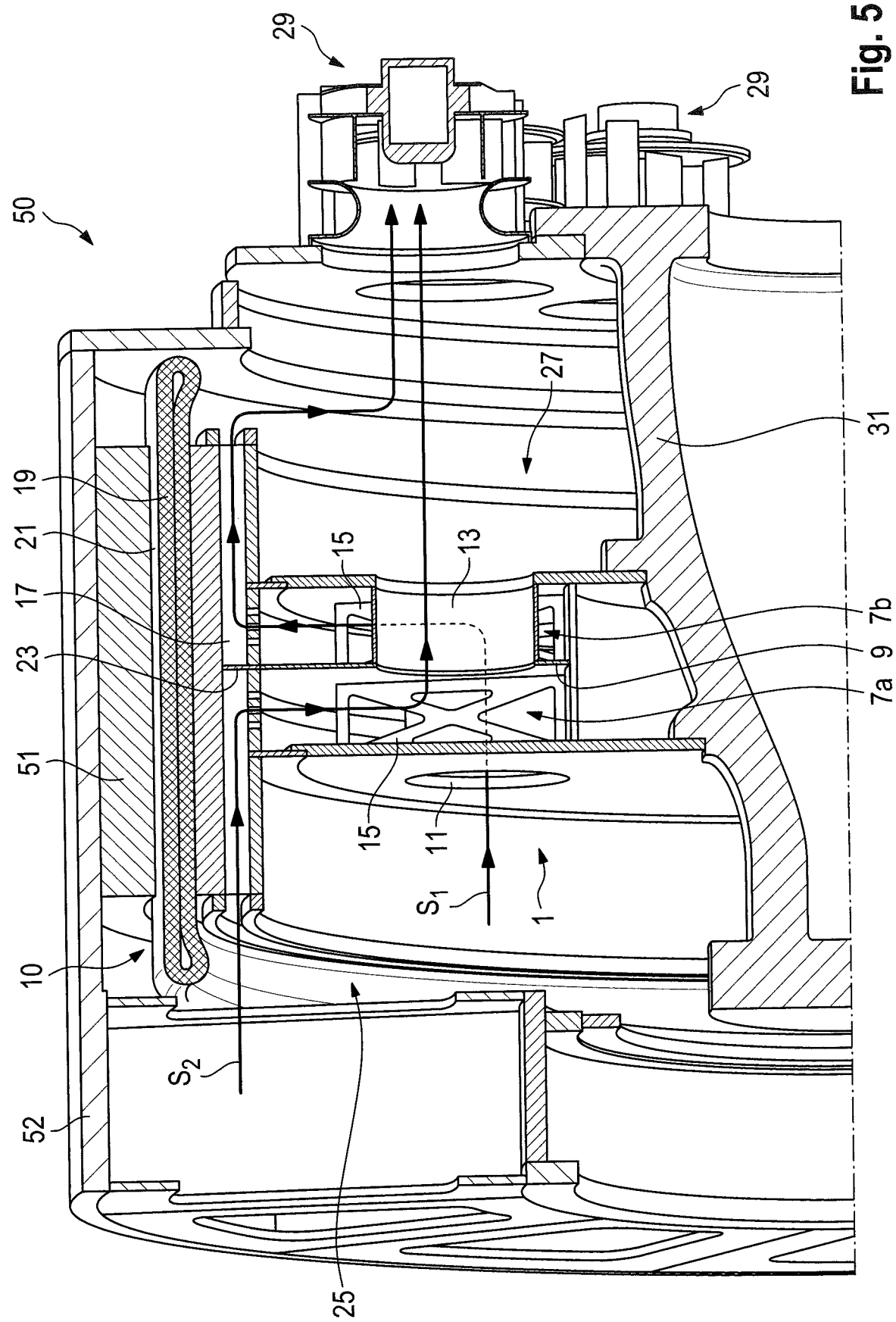
FIG. 5 shows a diagrammatic sectional view through a stator and generator for a wind turbine as shown in FIG. 1.

FIG. 5 shows by way of example the arrangement of the two air flow $S_1$ and $S_2$. The air along the air flows $S_1$ and $S_2$ is optionally put into a turbulent state in the cavity portions 7a, 7b by means of the support struts 15. Otherwise, in regard to the structure which can be seen in FIG. 5, reference is directed to the components of FIGS. 3 and 4 which correspond in that respect.

Finally FIG. 6 shows a detail view of the end 25 of the stator 10 in order to complete the picture. The stator 10 has a first radial region 33 for receiving the stator winding, and a second region 35 which is radially inwardly adjacent thereto and in which the ventilation grooves 17 are provided. The flow path $S_2$ passes into the stator 10 through those ventilation grooves 17 in order then to flow through the stator 10 as shown in FIGS. 3 to 5.

As can be seen clearly from the foregoing description relating to FIGS. 1 to 6 provided is a highly efficient cooling option for stators which, by virtue of their depth, preferably 0.5 meters or more, particularly preferably 1.0 meters or more, in the case of conventional cooling concepts would be sufficiently cooled only on the afflux flow side, but would have a higher level of heat development at the flow discharge side due to the intermediate heating of the air. Although the cooling concepts have been shown with reference to the present embodiment for an external rotor generator the invention is also to be understood as being applicable to internal rotor generators.

The invention claimed is:

1. A stator carrier for a stator of a wind turbine generator, the stator carrier comprising:
    a first carrier plate;
    a second carrier plate;
    a cavity between the first and second carrier plates, wherein the cavity opens outwardly in a radial direction;
    a separating plate arranged between the first and second carrier plates and subdivides the cavity into a first cavity portion and a second cavity portion;
    a plurality of first flow passages extending from the first carrier plate directly into the second cavity portion; and
    a plurality of second flow passages extending from the second carrier plate directly into the first cavity portion.

2. The stator carrier according to claim 1 wherein the plurality of first flow passages and the plurality of second flow passages are each distributed uniformly over a periphery of the first and second carrier plates, respectively.

3. The stator carrier (1) according to claim 1 wherein the plurality of first flow passages are arranged in displaced relationship relative to the plurality of second flow passages in a peripheral direction of the first and second carrier plates.

4. The stator carrier (1) according to claim 1 wherein the plurality of first flow passages and the plurality of second flow passages are arranged on a same pitch circle diameter.

5. The stator carrier according to claim 1 wherein the plurality of first flow passages and the plurality of second flow passages each have a same opening cross-section.

6. The stator carrier according to claim 1 wherein the plurality of first flow passages and the second flow passages are oriented parallel to a longitudinal axis of the stator carrier.

7. The stator carrier according to claim 1 wherein the separating plate is coupled to the first and second carrier plates by a plurality of support struts.

8. A stator for a generator of a wind turbine, the stator comprising:
    a laminated stator core for receiving a stator winding; and
    the stator carrier according to claim 1, wherein the laminated stator core is fixed to the stator carrier,
    wherein the laminated stator core defines a first radial region for receiving the stator winding and a second radial region, the second radial region being adjacent to the first radial region, the second radial region having a plurality of ventilation grooves that lead to a first end of the stator and to an opposite second end of the stator, and
    wherein the plurality of ventilation grooves are connected in fluidic relationship in a region of the stator carrier to the cavity of the stator carrier.

9. The stator according to claim 8 wherein the plurality of ventilation grooves are interrupted by a separating wall arranged between the first and second carrier plates of the stator carrier in an axial direction.

10. The stator according to claim 9 wherein the separating wall and the separating plate are arranged in a same plane.

11. The stator according to claim 10 wherein the separating wall is integrally formed with the separating plate.

12. A generator of a wind turbine, the generator comprising;
    a generator rotor;
    a stator, wherein the generator rotor is arranged to rotate relative to the stator; and
    a stator carrier according to claim 1, wherein the stator is fixed to the stator carrier.

13. The generator according to claim 12 comprising a plurality of fans for generating an air flow through an interior of the generator.

14. The generator according to claim 13 wherein the plurality of fans is adapted to suck in air from the interior of the generator.

15. The generator according to claim 13 wherein:
    the generator has a first side facing a rotor hub and an opposite second side facing away from the rotor hub, and
    the plurality of fans is arranged on the second side of the generator.

16. A wind turbine comprising the generator according to claim 12.

17. The generator according to claim 12 wherein the generator rotor is an external rotor.

18. The generator according to claim 12 wherein the generator is a multi-pole slowly rotating synchronous ring generator.

19. The stator carrier according to claim 1 wherein the wind turbine generator is a multi-pole slowly rotating synchronous ring generator.

\* \* \* \* \*